J. A. COLE.
DEVICE FOR MEASURING THE VELOCITY OF FLOWING STREAMS.
APPLICATION FILED MAR. 14, 1907.
993,029.
Patented May 23, 1911.
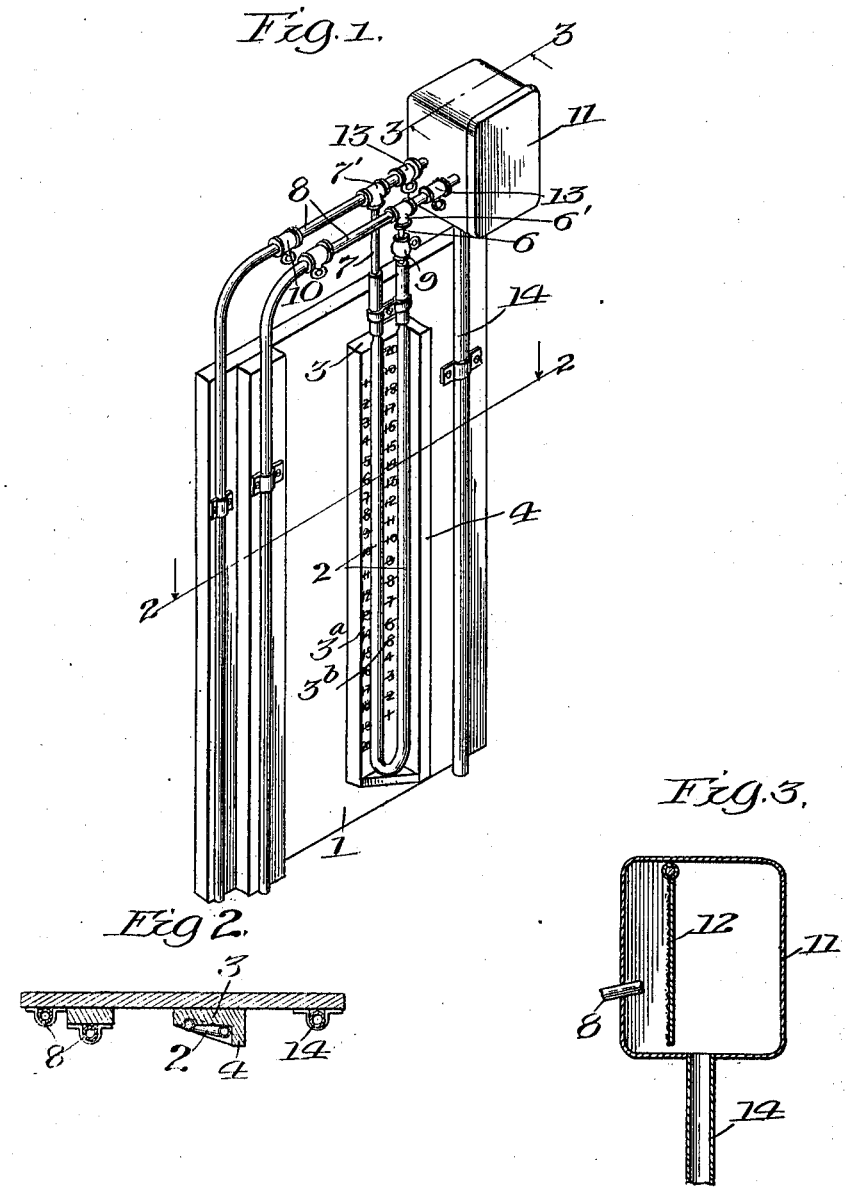

UNITED STATES PATENT OFFICE.

JOHN A. COLE, OF CHICAGO, ILLINOIS.

DEVICE FOR MEASURING THE VELOCITY OF FLOWING STREAMS.

993,029.  Specification of Letters Patent.  Patented May 23, 1911.

Application filed March 14, 1907. Serial No. 362,287.

*To all whom it may concern:*

Be it known that I, JOHN A. COLE, a citizen of the United States, residing at Chicago, in the county of Cook and State of Illinois, have invented a certain new and useful Improvement in Devices for Measuring the Velocity of Flowing Streams, of which the following is a full, clear, concise, and exact description, reference being had to the accompanying drawings, forming a part of this specification.

My invention relates to devices for measuring the flow of liquid in a pipe or similar conduit; and it relates in particular to a U-tube arrangement used in connection with a pitometer.

The principal object of the invention is to provide an arrangement by which the air can be easily and quickly allowed to pass off from the pitometer and connections so that the instrument will operate accurately.

In accordance with my invention, I provide an outlet or outlets from the U-tube or connections, and arrange means by which the flow of liquid from such outlet or outlets can be stopped after leaving the same. In this way the liquid can be drawn or allowed to pass off from the device or its connections, and will be stopped in its flow after escape, it being understood that the pressure of the liquid in the pipes under test is often very considerable so that if unobstructed, the escaping liquid would be discharged a considerable distance and so be very objectionable. By allowing the liquid to pass off in this way, and the connections from which the liquid is taken are preferably at the very top of the device, all the air is allowed to escape so that a continuous bank of water extends to and through the pitometer, thereby insuring accurate readings of the same. The air is drawn off in this way before the instrument is put into use and also from time to time during use as required by the accumulation of air.

In the accompanying drawing, Figure 1 is a perspective view of a pitometer with connections embodying my present invention; Fig. 2 is a cross section taken on line 2—2 in Fig. 1; and Fig. 3 is a view taken on line 3—3 in Fig. 1.

The arrangement shown in the drawings embodies a vertical board 1 which can be set or secured in any desired locality where the pitometer is to be used. As a general thing this board will be supported in the engine room or other similar part of the power plant where the test on the pumping apparatus is being made. Upon the board 1 is mounted a U-tube 2 which is understood to be connected with the water pipe or main whose flow of liquid is being measured or tested and this tube is partially filled with mercury on similar liquid, so that the velocity pressure of the liquid will be indicated by the difference in level of the mercury or other liquid in the two parts of the tube. As a preferred arrangement the tube is secured to the board 1 by means of a supplemental supporting board or bracket 3 which is secured to the board 1, and has two vertically disposed recesses for the two sides of the tube 2, and has its front face inclined so that one side of the tube is forward of the other. It is also provided with a forwardly projecting side wall 4. This supporting board is provided with two rows of numerals 3ª and 3ᵇ which are arranged alongside of the two sides of the tube 2, and numbered, the one from the top down and the other from the bottom up so as to permit reading of the height of the liquid in the two sides of the tube.

To the upper ends of the tube 2 are connected pipes 6 and 7 which are connected by T's 6' and 7' with pipes 8, 8, which latter are understood to be connected with the pitometer inserted in the pipe or main under test. The pipe connection 6 is provided with a valve 9 and the pipes 8, 8 with valves 10, 10. A box 11 is mounted in position above the board 1, and is desirably made closed and provided with a rubber or similar baffle piece 12 suspended from the top of the box. The pipes 8, 8 are extended beyond the T's connecting them with the U-tube and led into the box 11 so that their ends are directed against the baffle piece 12. Valves 13, 13, are located between the T's 6' and 7' and the ends of said pipes. A drain pipe 14 is extended down from the box 11 to a suitable drain connection.

In the operation of the device, the pipes 8, 8 will be connected in the usual or any preferred way, with the pitometer or other device located in the water pipe or main, so that one tube will receive the pressure of the oncoming liquid and the other will receive the static pressure of the conduit. The tubes 8, 8 and the U-tube 2 will of course be filled with liquid at the pressure of the main. When air gets into the apparatus, it will seek the highest point and will accumulate at the top of the tubes 8, 8 and in the connections 6 and 7 of the U-tube. This air is objectionable inasmuch as it prevents the U-tube from giving accurate readings. When there is such an accumulation the valves 13, 13 are opened, thereby permitting liquid to be ejected from the ends of the pipes 8, 8 against the baffle piece 12. The escaping liquid carries the air with it and the baffle piece 12 tends to stop the flow of the liquid and prevent it striking the box 11. It then drains off through the drain pipe 14. When the air is all out, the valves 13, 13 are closed, thereby insuring a continuous column of water to and through the U-tube.

The arrangement for stopping the flow of water from the extensions of the pipes 8, 8, can of course be varied as it is obvious that many different arrangements can be devised for accomplishing this purpose. The arrangement shown, namely, the box, is convenient in that it provides a closed chamber where the water can be stopped without splashing and readily drained.

What I claim as my invention is:—

1. The combination of a U-tube, pipes connected with the opposite legs of said U-tube to transmit pressure to the liquid therein, a discharge pipe connected with each of said legs of the said tube, said discharge pipes and pressure transmitting pipes respectively of each leg of the U-tube being formed in one straight line, a drain pipe, and means for permitting discharge of liquid from either of said discharge pipes into the drain pipe.

2. The combination of a U-tube, pipes connected with the opposite legs of said U-tube to transmit pressure to the liquid therein, a discharge pipe connected with each leg of the U-tube, said pressure transmitting pipes and discharge pipes respectively of each leg of the U-tube being formed in a straight line, and means associated with each discharge pipe to open and close same.

3. The combination with a U-tube, of pipes 8, 8, connected therewith, said pipes 8, 8 having extensions extending beyond the connections with the U-tube, a box to which said extensions are extended, said box having a baffle member 12, valves 10, 10 in the pipes 8, 8, a valve 9 on one side of the U-tube and valves 13, 13 in the extensions of the pipes 8, 8, and a drain pipe 14 extending from the box 11.

4. The combination of a U-tube, pipes connected with the opposite legs of said U-tube to transmit pressure to the liquid therein, outlet pipes extended from the upper portion of the two legs of the tube, said outlet pipes and pressure transmitting pipes respectively of each leg of the U-tube being formed in a straight line, a drain pipe, and means for directing the escaping liquid from said outlet pipes into the drain pipe.

5. The combination of a U-tube, pipes connected with the opposite legs of said tube to transmit pressure to the liquid therein, discharge pipes also connected with the opposite legs of said tube, said pressure transmitting pipes and discharge pipes respectively of each leg of the U-tube being formed in a straight line, a drain pipe, and a baffle device for stopping the discharged liquid and directing the same into the drain pipe.

6. The combination of a U-tube, a gage board mounted behind said tube, said gage board having numerals indicating the height of liquid in the two legs of the tube, pressure pipes connected with the two legs of said tube, and discharge pipes also connected with the two legs of said tube, and extended transversely across the tops of the same.

In witness whereof, I hereunto subscribe my name this 8th day of March A. D., 1907.

JOHN A. COLE.

Witnesses:
A. M. BELFIELD,
I. C. LEE.

---

Copies of this patent may be obtained for five cents each, by addressing the "Commissioner of Patents, Washington, D. C."